R. WELLS.
METHOD OF EXTRACTING VALUES FROM GARBAGE AND THE LIKE.
APPLICATION FILED JAN. 2, 1918.
1,307,992.
Patented June 24, 1919.
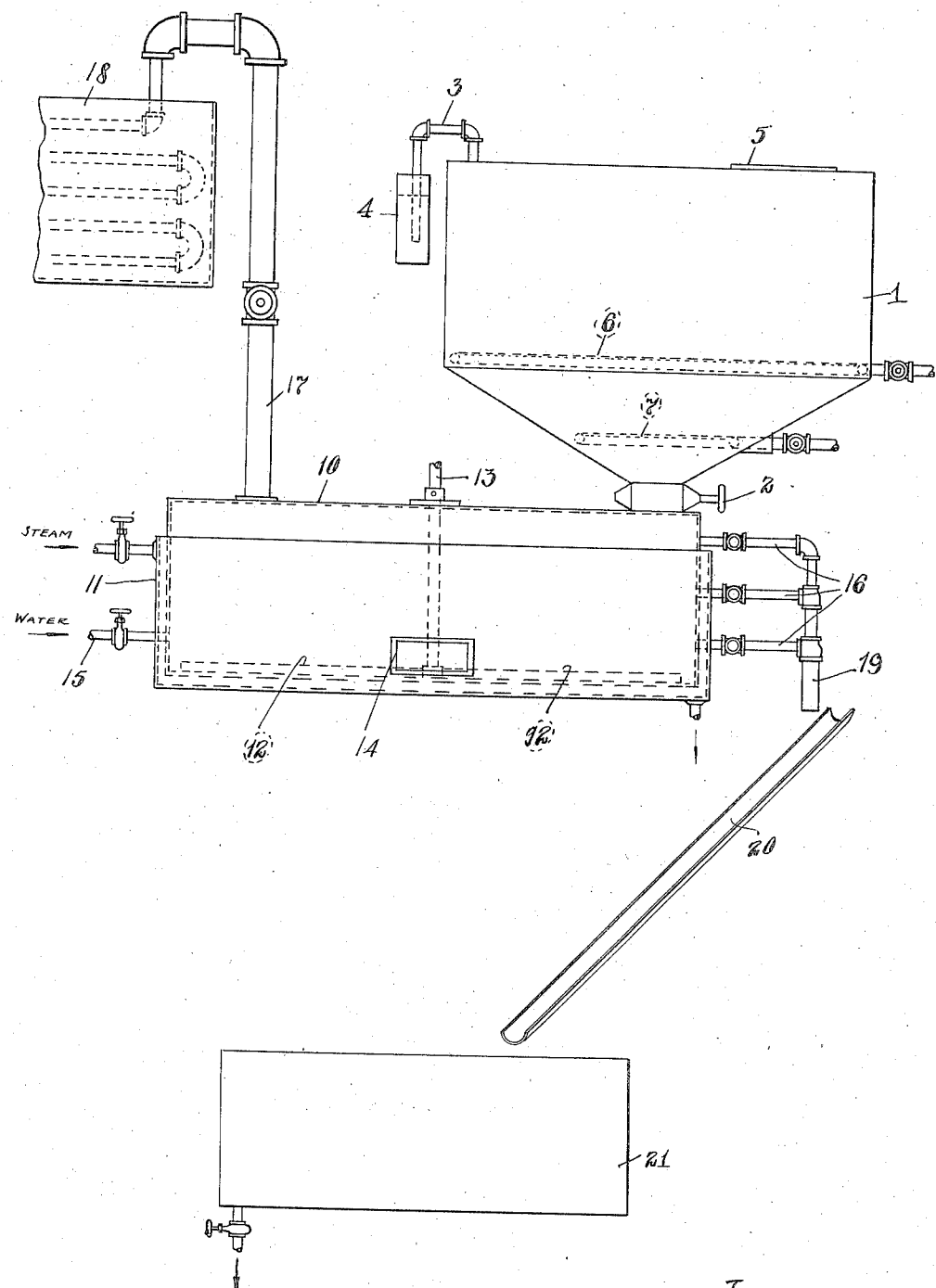
INVENTOR
Raymond Wells.
By Fay, Oberlin & Fay
ATTORNEYS.

UNITED STATES PATENT OFFICE.

RAYMOND WELLS, OF HOMER, NEW YORK, ASSIGNOR TO COBWELL CORPORATION, OF CLEVELAND, OHIO, A CORPORATION OF VIRGINIA.

METHOD OF EXTRACTING VALUES FROM GARBAGE AND THE LIKE.

1,307,992.     Specification of Letters Patent.     Patented June 24, 1919.

Application filed January 2, 1918. Serial No. 209,815.

*To all whom it may concern:*

Be it known that I, RAYMOND WELLS, a citizen of the United States, and a resident of Homer, county of Cortland, and State of New York, have invented a new and useful Improvement in Methods of Extracting Values from Garbage and the like, of which the following is a specification, the principle of the invention being herein explained and the best mode in which I have contemplated applying that principle, so as to distinguish it from other inventions.

In the usual method of carrying out the reduction of garbage, the moisture is eliminated and the grease removed from the residuum by means of a bath of solvent media having a higher boiling point than water. As a result of such processing there takes place in the residuum a certain change which renders the material unfit for stock feeding purposes, and limits its use to that of a fertilizer. So far as I am aware this change is not determinable by chemical means, although it has been ascribed by some investigators to a peculiar change in the protein bodies and possibly to the elimination of the so-called vitamins.

Whatever the reason, the fact remains that the tankage resulting from the degreasing of organic materials, by means of volatile solvents, renders them either wholly or in part non-nutritious, so that the only use for such material heretofore has been for soil fertilization; this despite the fact that in the green or cooked state, prior to such treatment for the extraction of the grease, garbage is a very desirable food stuff for stock, particularly for hogs, the latter relishing it and flourishing upon it. It has been found practically impossible to dry garbage on a large scale in order to utilize it as a food stuff, owing to the fact that if heat be employed in such drying process, the starches are freed, with the consequently formation of a stiff, sticky binding material. This, together with the sugars present, renders the mass extremely difficult to handle, causing it to ball up if stirred, and when thus balled up further drying is very slow, since heat cannot get access to the inner portions of the balls or lumps that are formed.

In any such drying operation, moreover, the grease in the original garbage of course remains in the tankage, and, as it is the most valuable portion of the garbage, this occasions considerable financial loss. In other words, the tankage would be practically as valuable as a food stuff without the grease, and the latter is thus in effect wasted.

The present improved process for treating garbage and like material has as its object the extraction of the grease without rendering the residual tankage unavailable for use as a food. At the same time other values in the original material are recovered, so that on the whole an unusually economical and practical process for the treatment of materials of the class in question is provided. It will be understood that the process is not limited to the treatment merely of garbage, in which would be included abattoir and rendering-house offals and the refuse and raw materials of fish, vegetable or meat canneries, but it is equally adaptable for the extraction of the essential oils from seeds, beans and other oil-bearing vegetable substances.

To the accomplishment of the foregoing and related objects, the invention, then, consists of the means and steps hereinafter fully described and particularly pointed out in the claims, the annexed drawing and the following description setting forth in detail certain means and one mode of carrying out the invention, which, however, illustrate but one of various ways in which the principle of the invention may be used.

In said annexed drawing:—

The single figure there appearing is a side elevational view, more or less diagrammatic, of apparatus for carrying out my improved process or method.

In carrying out such process or method, the material to be treated, for example municipal garbage, is, upon arrival at the plant, picked over as usual for the removal of tin cans, rags and similar refuse, whereupon it is placed in large tanks, preferably of light steel construction and capable of being tightly closed. In the drawing, only one such tank 1 is illustrated; the number of such tanks, however, will of course depend upon the capacity of the plant, and their size will be varied to comport with the size of the associated reduction tank. Preferably such tank 1 is of general cylindrical form, with a conical bottom, a valve 2 of adequate size forming the bottom outlet. The top of the tank has a vapor outlet 3 which leads to a small condenser 4 for the condensation of odors, and is further provided with a manhole 5 for filling such manhole being capable hole 5 for filling, such manhole being capable more provided interiorly with a perforated steam coil 6, which should be of considerable size, so that the mass may be heated as speedily as possible, and also with another perforated pipe 7 for the addition of malt infusion and yeast at appropriate times, as will be presently described.

As soon as the tank has been filled to the proper level, live steam is admitted through the steam coil 6, and the material raised to the boiling point and there kept for several hours. The object of this treatment is to rupture the starch cells and cause the starches, gums and sugars to go into solution. Contrary to the usual method of procedure in the decoction of grains and potatoes, it has been found unnecessary to digest the material under pressure, in order thus to liberate the starch, this possibly being due to the fact that free organic acids are present in the mass in considerable quantity and may assist in the processing.

After being cooked for a sufficient time, the mass is allowed to stand and cool to approximately 150° F., further digestion taking place during this period of cooling, so that by the time the malting temperature (140° F.) is reached, the major portion of the starch is liberated, or in such condition that the diastase of the malt can readily act upon it and convert it into sugars and dextrin. When the proper saccharizing temperature is reached, 0.5 per cent. by weight of ground malt is fed, in the form of an infusion in water, through the pipe 7, steam being at the same time turned on momentarily through the coil 6, in order to agitate and mix such malt with the mass of cooked material. Cooling of the latter is thereupon allowed to continue until a temperature of approximately 90° F. is reached, the period required for such cooling being sufficient for the conversion of the starches into sugar and dextrin by the malt as may be determined by the familiar iodin test.

At this stage, yeast is added to the mass through the same pipe 7 through which the malt was fed, such yeast being added in the proportion of five pounds to one ton of garbage in the original loading, or mass. Fermentation will ordinarily start in about two hours, and is desirably allowed to proceed for from thirty to forty hours. During such fermentation, the gases, which are given off, are discharged through the vent pipe 3 and washed of any disagreeable odor by the condenser 4. At the end of the fermentation period, the original mass of coarse rough garbage, has been broken up by the cooking, saccharizing and fermentation, into a semi-liquid mass of fiber, nitrogenous bodies, grease, inorganic salts and water, the alcohol resulting from the fermentation of the starches and sugars being in solution in the latter.

The fermented mass in question is passed into a suitable chamber 10, preferably in the form of a relatively shallow cylindrical tank, which is surrounded by a steam jacket 11 for the purpose of heating such tank and its contents, and with stirring arms 12 carried by a central vertical shaft 13, such arms lying close to the bottom of the tank, as shown in the drawing. The tank is also provided with a door 14, preferably in its side, for the removal of material from its interior, with a pipe 15 for supplying hot water to such interior, and with a series of vertically spaced outlet pipes 16 for the withdrawal of liquid from said tank, as will be presently described. All of the aforesaid pipes are of course controlled by valves, as need not be specifically noted.

Following transfer of the fermented mass from tank 1 to tank or chamber 10, approximately twenty-five per cent. of the water content of such mass is eliminated by the application of heat, i. e. by introducing steam into jacket 11. This water passes off through pipe 17 connected with a condenser 18, and carries with it the entire available portion of alcohol.

The residue in chamber 10 is still very wet and sloppy, and by action of the steam in the evaporation step just described, together with the agitation attending the operation, produced by rotating shaft 13 and stirring arms 12, the grease will be brought to the surface of the mass to a greater or less extent. Such grease is found floating on the top, but so close to the mass of fiber which constitutes the tankage proper, that hand skimming, obviously impossible on a large scale, would alone free it from such mass.

For this reason I have evolved a method of floating off such grease by introducing carefully on the top of the mass boiling water through pipe 15 in sufficient quantity to form a layer of water below such layer of grease. This layer of water is then withdrawn through one or the other of the outlet pipes 16, and in passing out carries with it a large portion of the supernatant grease. This process of floating with water is repeated several times, until the amount of grease left behind is reduced to a minimum. Practically all of that which originally was found floating on the top of the mass can be removed in this way, as well of course as all of the water that was added for the purpose of effecting such removal. The water, with the grease floated off thereby, is discharged through a pipe 19 and trough 20, or other suitable connection, into a settling tank 21, where the water and grease may be separated, as need not be further described.

Not all of the grease content of the garbage of course is removed by this method, but repeated tests have shown that the residuum will rarely contain over ten to twelve per cent. of grease. Thus in a ton of garbage, containing four per cent. of grease, eighty pounds are theoretically available. Such garbage will ordinarily contain approximately twenty-two per cent. of solids which, by fermentation and the elimination of the starch and sugar thereby accomplished, is reduced to fifteen per cent., i. e. three hundred pounds of solid matter per ton. If the residual solid matter, after the extraction of the grease by the method of flotation just described above, contains only ten per cent., it will be evident that fifty pounds of the original eighty pounds contained in the garbage, or 62.5 per cent., has been recovered. The grease remaining in this residual mass or tankage is of value only as it is of value as a food stuff.

After the removal of the grease in the fashion just described, the residual mass is then dried by the application of further heat through the medium of the steam jacket, without, however, adding any solvent. In view of the elimination of the starch and sugars and of the major portion of the grease, there is no longer any tendency of the mass to ball up, and the drying is accomplished without difficulty. The resulting tankage contains the grease not eliminated by flotation, but is otherwise no different from the original fermented mass, save that it is dry and in a convenient form to handle.

Aside from the production of a residue thus available as a food stuff, the grease recovered in the fashion above described is of a very much better color and of a considerably greater value than that extracted with the use of a solvent, since the solvent appears at the same time to extract other undesirable elements as well, which frequently discolor the grease. At the same time the cost of operation is greatly reduced, compared with processes in which a solvent is employed, not only because of the more compact apparatus and lessened manipulation, but the investment in expensive solvent tied up in process is of course saved, as well as the losses due to such waste of solvent as necessarily occurs incidentally to its handling. At the same time absolute safety and freedom from fire risk is secured.

The subsequent treatment of the alcoholic water or "wash" obtained by the preliminary heating of the fermented mass in chamber 10 need not be described in detail. Such wash is rendered neutral with lime water, and concentrated in any preferred type of alcoholic still; or, if desired, it need not be rectified and concentrated at all, but may be treated as a vinegar liquid, and by suitable process converted into weak acetic acid, and ultimately into acetate of lime or acetone.

Other modes of applying the principle of my invention may be employed instead of the one explained, change being made as regards the method herein disclosed, provided the step or steps stated by any one of the following claims or the equivalent of such stated step or steps be employed.

I therefore particularly point out and distinctly claim as my invention:—

1. In a method of recovering values from garbage and like materials containing starches, sugars or gums as well as oils, greases or fats, the steps which consist in fermenting such first-named ingredients in the original mass; driving off the alcohol thus produced together with a portion of the water; and then removing such of the oils, greases or fats as rise to the top of the residual mass.

2. In a method of recovering values from garbage and like materials containing starches, sugars or gums as well as oils, greases or fats, the steps which consist in fermenting such first-named ingredients in the original mass; driving off the alcohol thus produced together with a portion of the water; removing such of the oils, greases or fats as rise to the top of the residual mass; and then driving off the water remaining in such mass, so as to leave the latter practically dry.

3. In a method of recovering values from garbage and like materials containing starches, sugars or gums as well as oils, greases or fats, the steps which consist in fermenting such first-named ingredients in the original mass; driving off the alcohol thus produced together with a portion of the water; and then floating off with hot water such of the oils, greases or fats as rise to the top of the residual mass.

4. In a method of recovering values from garbage and like materials containing starches, sugars or gums as well as oils, greases or fats, the steps which consist in fermenting such first-named ingredients in the original mass; driving off the alcohol thus produced together with a portion of the water; floating off with hot water such of the oils, greases or fats as rise to the top of the residual mass; and then driving off the water remaining in such mass, so as to leave the latter practically dry.

5. In a method of recovering values from garbage and like materials containing starches, sugars or gums as well as oils, greases or fats, the steps which consist in fermenting such first-named ingredients in the original mass; heating the latter so as to drive off approximately twenty-five per cent. of the water present, the latter carrying with it the alcohol produced by such fermentation; floating off with hot water such of the oils, greases or fats as rise to the top of the residual mass; and then heating and stirring such residual mass until the water remaining therein is practically all driven off.

6. In a method of recovering values from garbage and like materials containing starches, sugars or gums as well as oils, greases or fats, the steps which consist in fermenting such first-named ingredients in the original mass; heating the latter so as to drive off approximately twenty-five per cent. of the water present, the latter carrying with it the alcohol produced by such fermentation and the oils, greases or fats rising to the top of the residual mass; introducing a layer of hot water beneath such oils, greases or fats; drawing off such water with such oils, greases or fats floating thereon; and then heating and stirring such residual mass until the water remaining therein is practically all driven off.

7. In a method of recovering values from garbage and like materials containing starches, sugars or gums as well as oils, greases or fats, the steps which consist in cooking the original mass; thereupon saccharizing the same and adding a suitable yeast, whereby such first-named ingredients are converted into alcohol or derivatives thereof; driving off the alcohol thus produced together with a portion of the water; and then removing such of the oils, greases or fats as rise to the top of the residual mass.

8. In a method of recovering values from garbage and like materials containing starches, sugars or gums as well as oils, greases or fats, the steps which consist in cooking the original mass; thereupon saccharizing the same and adding a suitable yeast, whereby such first-named ingredients are converted into alcohol or derivatives thereof; driving off the alcohol thus produced together with a portion of the water; removing such of the oils, greases or fats as rise to the top of the residual mass; and then driving off the water remaining in such mass, so as to leave the latter practically dry.

9. In a method of recovering values from garbage and like materials containing starches, sugars or gums as well as oils, greases or fats, the steps which consist in treating a mass of such material so as to cause the oils, grease or fats to rise to the top; and then floating the same off with hot water.

10. In a method of recovering values from garbage and like materials containing starches, sugars or gums as well as oils, greases or fats, the steps which consist in treating a mass of such material so as to cause the oils, grease or fats to rise to the top; introducing a layer of hot water beneath such oils, greases or fats; and then drawing off such water with such oils, greases or fats floating thereon.

Signed by me, this 20 day of December, 1917.

RAYMOND WELLS.